United States Patent [19]

Nied et al.

[11] Patent Number: 4,596,917
[45] Date of Patent: Jun. 24, 1986

[54] RESISTANCE SPOT WELDER PROCESS MONITOR

[75] Inventors: Herman A. Nied, Ballston Lake; Stanley J. Godwin, Schenectady; Robert K. Cohen, Troy; Robert V. Klint, Rexford; Hsin-Pang Wang, Scotia, all of N.Y.

[73] Assignee: General Electric Company, Schenectady, N.Y.

[21] Appl. No.: 571,233

[22] Filed: Jan. 16, 1984
(Under 37 CFR 1.47)

[51] Int. Cl.$^4$ .............................................. B23K 11/24
[52] U.S. Cl. .................................. 219/109; 219/117.1
[58] Field of Search ...................... 219/109, 110, 117.1

[56] References Cited

U.S. PATENT DOCUMENTS

| 3,609,285 | 9/1971 | Scarpelli | 219/109 |
| 3,708,648 | 1/1973 | Croucher et al. | 219/109 |
| 4,329,561 | 5/1982 | Schafer et al. | 219/110 |
| 4,447,700 | 5/1984 | Cohen | 219/110 |

OTHER PUBLICATIONS

Mollica, R. J., "Adaptive Controls Automate Resistance Welding", Welding Design & Fabrication, Aug. 1978, pp. 70–72.

Kuchar, N. R. et al., "A Closed-Loop Control System for Resistance Spot Welding", Measurement and Control for Batch Manufacturing, ed. by D. E. Hardt, ASME WAM, Nov. 14–19, 1982, pp. 89–103.

Nied, H. A., "The Finite Element Modeling of the Resistance Spot Welding Process", 64th AWS Annual Meeting, Apr. 25–29, 1983.

Primary Examiner—Clifford C. Shaw
Attorney, Agent, or Firm—Donald R. Campbell; James C. Davis, Jr.; Paul R. Webb, II

[57] ABSTRACT

A multivariable process monitor and method of monitoring a resistance spot welding process to yield instantaneous information on weld quality during the weld cycle. Sensors on the machine measure welding input variables and workpiece response variables and provide signals to a microcomputer system. A simplified analytical model of the spot welding process is incorporated in the microcomputer and is the reference for the weld quality logic that accepts or rejects the weld. Faulty welds are diagnosed and the reason displayed.

12 Claims, 9 Drawing Figures

RESISTANCE SPOT WELDER PROCESS MONITOR

BACKGROUND OF THE INVENTION

This invention relates to a method of monitoring a resistance spot welding process during the weld operation and to a multivariable process monitor to detect poor quality welds.

Most resistance spot welding production procedures consist of establishing the process welding parameters by trial and error. Once these production parameters have been established, the percent heat, electrode load and cycles are set. During production, occasional test coupons are made which are destructively inspected to determine weld nugget size and penetration. This manufacturing procedure has produced faulty welds since the test coupon geometry, surface conditions, etc., may not be representative of the production conditions. The intent of this invention is to eliminate the problem of poor welds during production by sensing dominant variables needed to assure weld quality.

There are essentially four types of spot welder process monitors on the market which are grouped according to the single parameter measured in the welding process. They are: (1) thermal expansion monitors; (2) nugget resistance monitors; (3) power input monitors; and (4) ultrasonic, acoustic, and infrared type monitors. It was concluded that no single system existing in the market can be relied on to give assurance of spot weld quality. Experiments have shown, for instance, that type (1) monitors based on measuring only thermal expansion can produce poor welds even though the system predicted good quality. The advantages of installing the disclosed improved process monitor on a resistance spot welder is that it will prevent poor welds from creeping into production without being detected and eliminate the costly and time consuming procedure of welding test coupons for destructive examination.

SUMMARY OF THE INVENTION

The improved method and apparatus to monitor the resistance spot welding process during the welding operation is based on the multivariable approach to evaluate spot weld quality. A mathematical, analytical model of the spot welding process in a microcomputer serves as the reference for the multivariable sensing and decision logic system. The process monitor will detect poor weld quality and alert the operator, and may be a recording device for all welds to facilitate reinspection of questionable ones. The hardware components are: machine-mounted sensors to measure welding input variables and workpiece response variables; a microcomputer for data aquisition, analysis and diagnosis; and peripheral equipment such as a graphics terminal for input-output and display. The sensed input variables are electrode load, tip voltage and current, optionally primary voltage. The measured process response variables are electrode displacement and various temperatures, and may include nugget penetration and electrode acceleration.

The monitoring method further comprises deriving computed response functions during the weld cycle from the simplified analytical model which simulates the spot welding process and predicts the formation and growth of a weld nugget and faulty welds such as stuck welds and the onset to expulsion. Inputs to this model are welding time, the measured input variables, and known machine and workpiece parameters and material properties. From the measured response variables are derived process response functions. In the weld quality logic these computed and process response functions are compared and evaluated with reference to criteria for good quality welds, and the weld is accepted or rejected. Faulty welds are diagnosed and the reason for the unacceptable weld, that there is a machine malfunction or the operation is incorrect, is displayed. The characteristics of good quality welds can be stored in a record file.

DETAILED DESCRIPTION OF THE INVENTION

Figure 1:
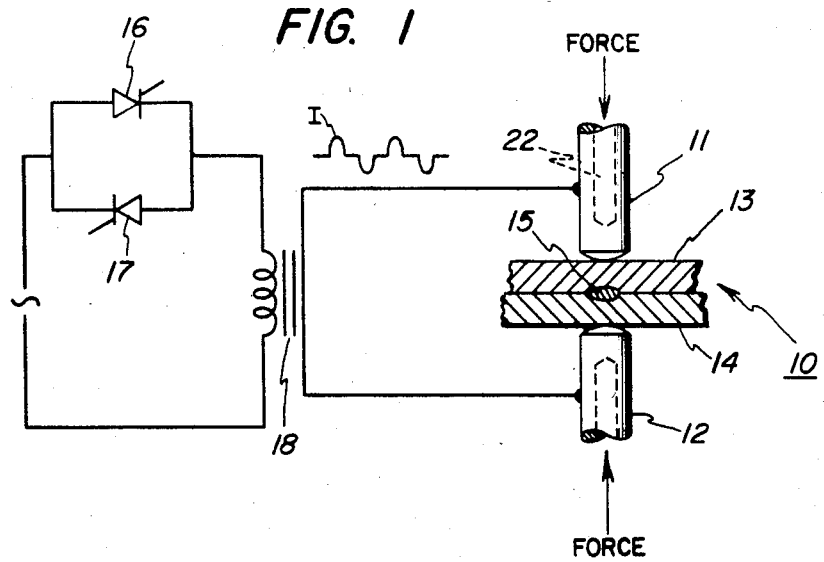
FIG. 1 illustrates the resistance spot welding process and a single-phase welding machine.

An introductory discussion of the welding process is warranted because it identifies features included in an analytical model to provide a realistic simulation. The electrical resistance spot welding process of joining two materials due to a localized metallic fusion across their interface is a complicated electrical, thermal, mechanical and metallurgical phenomenon. The low electrical resistance electrodes, which carry a high current to a localized area of the workpieces, exert a concentrated force on the outer surfaces of the materials to be joined. This electrode force produces a local deformation at the interface of the metals to be joined and indents the outer surfaces due to the highly concentrated compressive stresses. The purpose of the initial electrode load is to properly seat the workpieces and to maintain good electrical contact. The total electrical resistance of the system, composed of the copper electrodes and the metal sheets to be joined, consists of the material resistances of the copper and the workpieces, plus the surface contact resistances at each material interface. The surface contact resistance is due to surface films, oxides and asperities at the interfaces. A high electrode force, producing a localized compressive interface stress, will break down the asperities of the surfaces, thereby providing good contact which will result in reduced surface electrical resistance. Since the electrical resistances of the copper electrodes and metals to be joined are small, a large current discharge is needed to produce the Joule heating effect. The voltage drop and Joule heating effect are largest in the workpieces since the resistivity of the copper electrodes is an order of magnitude less than most metals to be joined.

The transient heating generates thermal expansion and stresses due to the high temperature gradients. If the high current is maintained for a sufficient length of time, melting will initiate at the common interface of the workpieces and spread to produce the weld nugget. This phase change from solid to liquid produces a drastic change in material properties. During the weld cycle, the electrode load is maintained to offset the high internal thermal expansion and, thereby, contain the molten metal within the workpiece. This prevents liquid metal expulsion. It is obvious that, during the welding cycle, the electrode load also helps to maintain proper electrical and thermal contact until the formation of the weld nugget is completed. The weld cycle is terminated by switching the current off while maintaining the electrode load. The final stage of the process is the hold cycle, which establishes the metallurgical quality of the weld nugget. During the hold cycle, the nugget cools and contracts. Mechanical load is essential to provide the necessary forging pressure to obtain a good metallurgical structure and to prevent the formation of shrinkage voids. The hold time is also important since it establishes the rate of cooling as long as electrode contact is maintained.

The basic resistance spot welding system 10 in FIG. 1 includes electrodes 11 and 12 which exert a concentrated force and carry a high current to a localized area of metal workpieces 13 and 14. A weld nugget 15 is formed from the molten zone emanating from the workpiece interface, joining the two workpieces. Water cooled, spherical end electrodes are shown but the invention is applicable to truncated end, flat end, offset, and other types. A single phase electrical energizing circuit has inverse-parallel silicon controlled rectifiers 16 and 17 in series with the primary winding of welding transformer 18. The SCRs are phase controlled and naturally commutated and control the number and magnitude of the AC current pulses supplied to the electrodes. A typical three phase power circuit would have a three phase-to-three phase transformer and a secondary circuit including low voltage rectifiers to deliver high current, low voltage power pulses to the electrodes.

Figure 2:
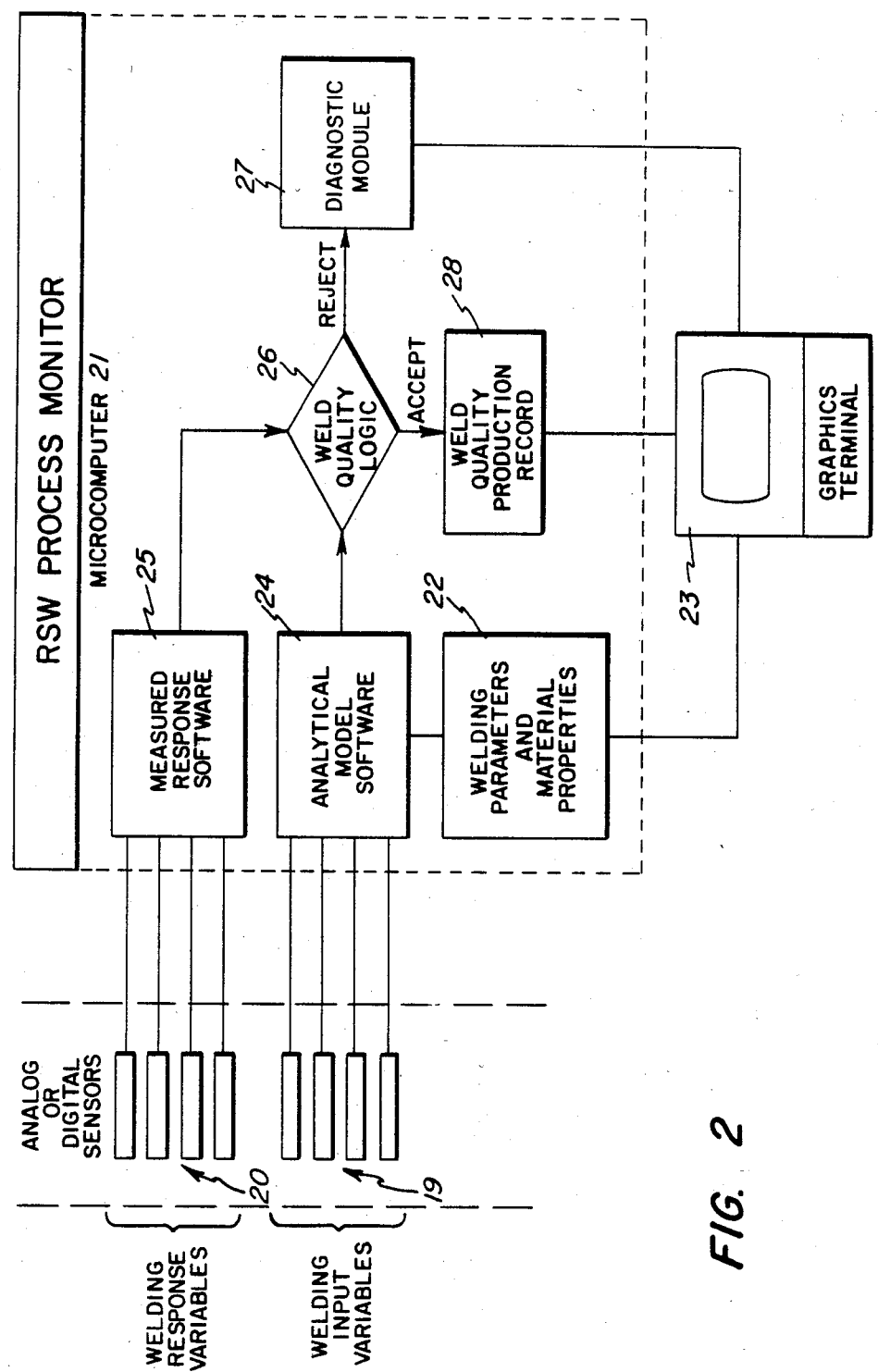
FIG. 2 is a schematic of the multivariable process monitor.

The multivariable process monitor and diagnostic system illustrated schematically in FIG. 2 will provide instantaneous information on weld quality during the weld cycle. The key to this invention is the incorporation of a simplified anaiytica model of the resistance spot welding process in the microcomputer which serves as the reference for the multivariable sensing and decision logic system. The components which make up the process monitor consist essentially of three groups of hardware: (1) sensors or transducers to measure welding variables, (2) a microcomputer for data acquisition, analysis and diagnosis, and (3) peripheral equipment such as a graphics terminal for input/output and display.

There are three categories of welding variables measured during the process. The first group are the forcing functions such as: current, voltage and electrode mechanical load which are applied. The second group of variables are response variables such as: displacement of electrodes due to thermal expansion, temperature, acceleration, and penetration. The third is the variable time which is set on the welder controls or which is varied by an adaptive controller. Specific examples of analog or digital sensors 19 and 20 to measure the welding input and response variables are given later.

The microcomputer 21 may be represented schematically as having several hardware and software modules. The analytical model which simulates the resistance spot welding process will predict the formation and growth of a weld nugget. It also has the capability to predict faulty welds, such as expulsion and lack of penetration. The microcomputer has a welding parameter and material properties file 22 which is established using the interfacing terminal. This file or memory contains temperature dependent mechanical, thermal and electrical material properties, electrode characteristics, etc. Graphics terminal 23 is used to input the workpiece material type, electrode type and workpiece thickness. Forcing function signals from sensors 19 and the welding time are inputs into the analytical model software or subroutine 24 which computes the welding response functions. Signals from welding response sensors 20 are inputs into the measured response software or subroutine 25. Outputs from these modules are evaluated by the weld quality logic module 26, i.e., the measured response is compared to the computed response. The decision logic therein either accepts or rejects the weld. If the weld is rejected, a diagnostic module 27 alerts production and displays the reason for the faulty weld. If the weld is accepted, the weld characteristics are stored in a weld quality production record file 28.

Figure 3:
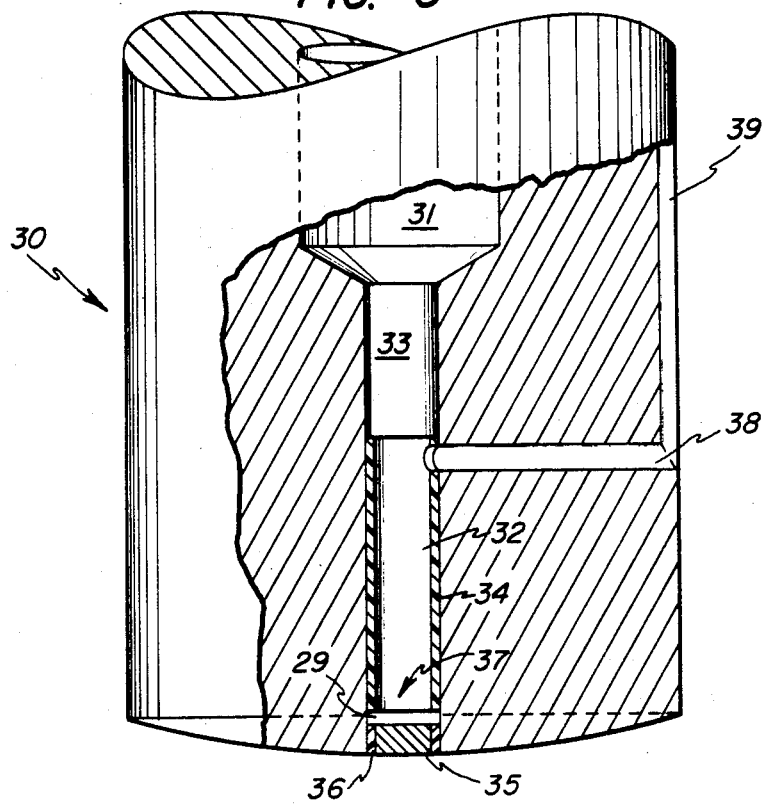
FIG. 3 shows an instrumented electrode having multiple variable sensing capability.

The instrumented spot welding electrode in FIG. 3 provides part of the multivariable sensor data needed by the process monitor. Welding system variables sensed by the instrumented electrode and appropriate instrumentation may include: workpiece surface temperature and electrode temperature along its axis (measured by thermocouples or diodes); voltage (measured from electrode to electrode by contact shoes); current (measured by a Hall effect sensor mounted within the electrode); electrode load (measured via a piezoelectric cell or resistance strain gauge built into the electrode tip); thermal displacement (measured by a piezoelectric accelerometer internally or by a linear displacement gauge externally); and weld penetration (measured by an ultrasonic piezoelectric transducer in a cavity in the tip). It is not essential that all of the foregoing are inside the electrode; some of the instrumentation can be exteriorally mounted.

The water cooled, spherical end, instrumented electrode 30, FIG. 3, has a longitudinally disposed cooling channel 31 and a narrow diameter channel 32 that is machined from the end face to channel 31 and stopped off at the water cooling end by a sealing plug 33. The wall of this narrow channel is lined with an electrically insulating sleeve 34. A contact plug 35 is inserted into the channel at the tip and is thermally and electrically insulated from the electrode body by a retaining ring 36. The contact plug is advantageously fabricated from silver, which has a high thermal diffusivity and low electrical resistivity, and thus provides an ideal contact transfer medium for measuring temperature and voltage close to the surface of the workpiece. One or more sensors 37 in a stacked arrangement are positioned contiguous to the back face of the contact plug, or are mounted at or in the lower portion of channel 32 which serves as a sensor chamber. Sensor output signals are routed through a number of leads (not shown) that pass through a radial bore 38 and peripheral groove 39 on the surface of the electrode. The leads are clear of the weld operation and routed for interconnection with external monitoring circuits. Refer to copending application Ser. No. 481,171, filed Apr. 1, 1983, now Pat. No. 4,472,620 H. A. Nied, "Instrumented Spot Welding Electrode".

An adaptive controller for a resistance spot welder implemented with a microcomputer and peripherals to handle the monitoring of multiple process variables and control the welding machine in real time disclosed in application Ser. No. 386,153, filed July 7, 1982, now Pat. No. 4,447,700 R. K. Cohen, "Resistance Spot Welder Adaptive Control". The sensors disclosed in this application on a multivariable microprocessor-based welding control system may be used. The electrode current sensor is a Hall effect transducer mounted in the throat of the welding machine; the electrode force is measured with a piezoelectric load cell built into the weld head or by a strain gauge and bridge circuit on the lower arm of the welder; displacement is measured by a linear or rotary digital encoder; electromagnetic interference is sensed by a current coil on the lower conductor arm; and other sensors are discussed. The continuous monitoring of weld nugget penetration during spot welding, and tracking the position of the liquid/solid interface by discrimination of reflected ultrasonic pulses in the time domain is taught in application Ser. No. 492,845, filed May 9, 1983, now Pat. No. 4,449,029 H. A. Nied, "Acoustic Wave Spot Welder Adaptive Control". All of these are assigned to the same assignee.

Figure 4:
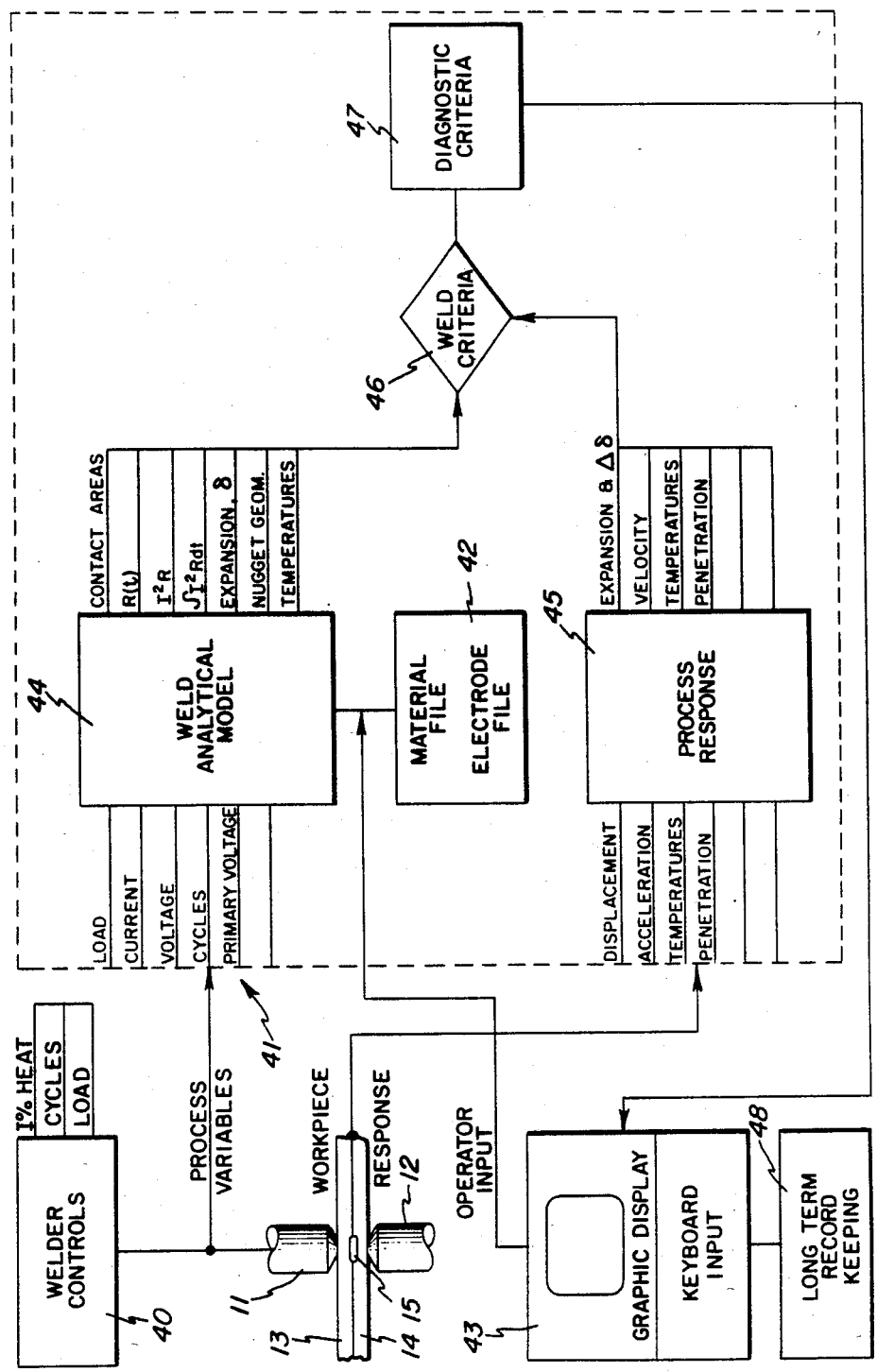
FIG. 4 is a more detailed block diagram of a specific embodiment of the process monitor.

One specific embodiment is shown in FIG. 4 of the multivariable process monitor and diagnostic system which provides real time information on weld quality. The welding machine is conventional and has welder controls 40 that permit setting percent heat (by adjusting the conduction intervals of the SCRs or ignitrons), cycles (number of cycles during the squeeze, weld and hold cycles), and load (by controlling the air pressure regulator). It is recalled that the analytical model which simulates the resistance spot welding process will predict the formation and growth of a weld nugget and predicts faulty welds. A simplified analytical model is given which illustrates the principles of the invention. The welding process input variables supplied to process monitor 41 are electrode load, electrode tip voltage, secondary circuit current, number of cycles (time), and primary circuit voltage. Knowledge of the load assures that the forging pressure is proper during the welding operation and enables the electrode/workpiece and workpiece/workpiece contact areas to be calculated. A low primary voltage signals that a poor quality weld is likely. The material and electrode file 42 has data on workpiece material type and thickness and the electrode type (truncated, spherical, etc.), size and cooling. Typically thin sheets of stainless steel are spot welded and the electrode is a copper-base alloy. This information is inputted by the operator at the keyboard on terminal 43. The material file has a listing of temperature dependent properties for the electrode and workpiece such as the modulus, coefficient of expansion, Poisson's ratio, density, conductivity, specific heat, specific resistance, melting temperature, and latent heat of fusion.

The weld analytical model is comprised of a number of mathematical equations, and simultaneously investigates the mechanical, electrical and thermal parameters and their interactions. Although such a model has the capability of analyzing the entire resistance spot welding process, only the squeeze and welding phases are examined by this particular simplified model, which predicts the formation and growth of the weld nugget. The following computed response functions are calculated:

1. Contact area. An important feature of the squeeze cycle analysis is determination of the areas of contact between the electrode and workpiece and at the faying surface. These are computed from the applied load and geometry of the electrode. After the electrode load application, the electrode indentation and the contact established at the faying surface becomes the geometric boundary conditions for the welding cycle. Knowledge of the contact area enables the current density to be calculated.

2. Total dynamic resistance, R(t). The workpiece dynamic resistance (the electrical resistance between electrodes) is calculated from electrode voltage and current when the rate of change of the latter is zero. In order to get a good weld the dynamic resistance must be within certain limits.

3. Joule heating rate, $I^2R$. Electrical energy is converted into heat by an amount equal to $I^2R$, where R is the dynamic resistance. If the heating rate is too low the proper nugget size is not attained because heat is dissipated too rapidly. This quantity is calculated on a cycle by cycle basis.

4. Total heat, $\int I^2 R dt$. The total heat produced during the welding process is computed as the summation from each cycle. A certain rate of heating and a certain amount of total heat are needed to get the proper nugget geometry.

5. Thermal expansion, $\delta$. The workpiece thermal expansion (electrode displacement) is an important weld quality discriminant; it is a measure of the formation and growth of the weld nugget with time. The model computes a target expansion and a large deviation from the target indicates a poor weld.

6. Nugget geometry. With the actual welding conditions used, the model gives a prediction of the expected weld nugget geometry; this has been proven experimentally. Nugget penetration (height), diameter and volume are calculated cycle by cycle. An acceptable weld will have a certain minimum size and good welds typically have 60% to 70% penetration.

7. Temperature distribution in the workpiece. The temperatures at the electrode/workpiece interface and workpiece/workpiece interface are computed, then as the weld nugget grows the location of the liquid/solid interface is predicted.

Figure 5:
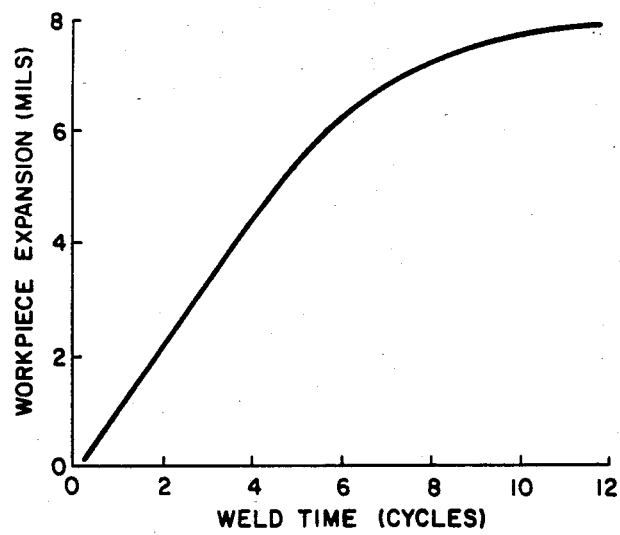
FIGS. 5–7 show, as a function of welding time, computed workpiece expansion, computed nugget diameter, and computed penetration.
Figure 6:
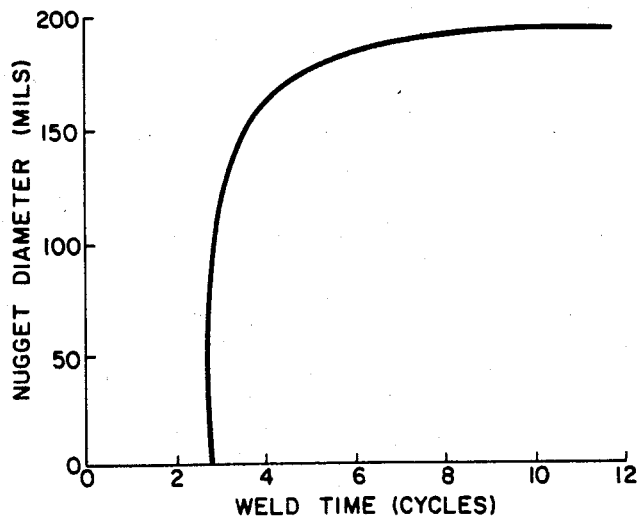
Figure 7:
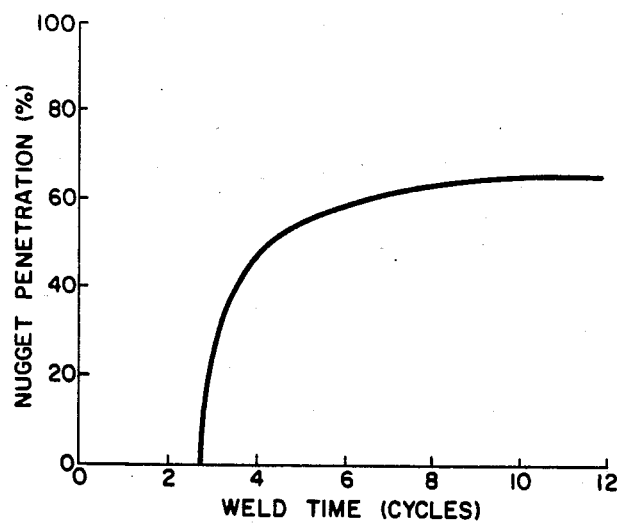
Figure 8:
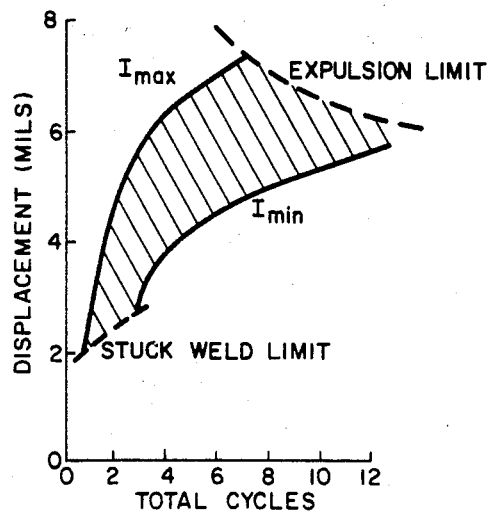
FIG. 8 illustrates the tolerance window generated by the analytical model used to evaluate the spot weld showing the extremes between stuck and expulsion weld limits.

The analytical model of the welding process makes it possible to compute the onset of melting and the formation and growth of the weld nugget, and the total thermal expansion of the workpieces. As a representative result, FIG. 5 shows the computed thermal expansion of two sheets of 0.034 inch thick 321 stainless steel as a function of time, during single phase 60 Hz welding with an applied load of 1000 pounds and a welding power of 8500 watts, using spherical end electrodes that have a 3 inch tip radius and 0.625 inch shank diameter. Under the same conditions, the predicted growth in weld nugget diameter and penetration (ratio of nugget height to total workpiece thickness) are shown in FIGS. 6 and 7. The model shows that melting is initiated shortly after the third current cycle. Nugget diameter and penetration initially increase very rapidly after the onset of melting, but the growth rate quickly decreases as the nugget surface area gets larger and approaches the cooler regions close to the electrode interfaces. This analytical model was validated by extensive experiments. Comparison between experimental data and modeling results showed that the model is capable of predicting workpiece response, nugget geometry and growth in terms of measurable and controllable process parameters. The model also can predict two important process boundaries shown in FIG. 8, the "stuck weld" boundary which represents the locus where melting and nugget formation begins and the expulsion boundary above which the molten nugget is not contained by the electrode force. Looking at the graph of displacement (thermal expansion) versus welding time, a process "window" for good quality welds is established which lies above the stuck weld limit, below the expulsion limit, and between maximum and minimum current limits. The boundaries of this window are computed given the workpiece thickness, material, etc.

Figure 9:
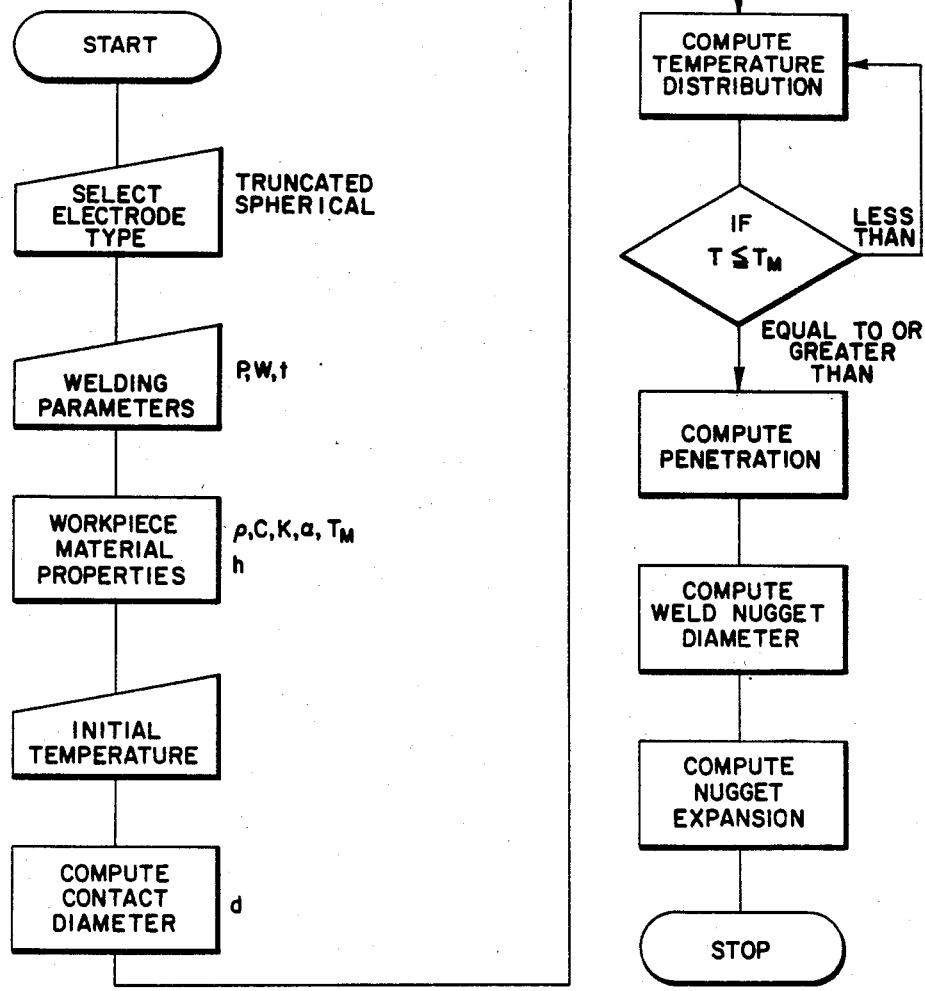
FIG. 9 is a flow chart of analytical model calculations.

One simplified analytical model of the resistance spot welding process is in the Appendix and the model flow chart is in FIG. 9. The simplified model has equations that give the process response when the measured input welding parameters are imposed as inputs. The solutions give the trends and all of the functional relationships. Such a model, which is readily computed in real time with present microcomputer systems, is to be distinguished from a finite element model. The latter uses a numerical technique and requires a large digital computer, and cannot be used in a process monitor. A comprehensive finite element model is described in the paper "The Finite Element Modeling of the Resistance Spot Welding Process", H. A. Nied, presented at the 64th American Welding Society Annual Meeting, April 25–29, 1983.

The process response module or subroutine 45 is drawn separate from the weld analytical model module 44, but it is just as accurate to combine them. The welding response inputs are: displacement of electrodes due to thermal expansion; acceleration of electrodes; workpiece surface temperature and several electrode temperatures taken along its axis; and weld nugget penetration or, alternatively, the set of reflected ultrasonic signals from the electrode/workpiece and liquid zone/solid zone interfaces from which penetration is calculated by pulse time discrimination of reflected waves. Standard state of the art microprocessor-based computations are performed, and the outputs are the variables and rates, cycle by cycle. Of these four parameters, displacement and temperature data is essential, actual measurement of penetration is desirable, and acceleration data is not needed for some monitors. The outputs of the process response module are total thermal expansion, $\delta$, and expansion rate, $\Delta\delta$; velocity, obtained by integrating acceleration; temperatures on a cycle by cycle basis; and penetration at each cycle.

The weld criteria module or subroutine 46 evaluates and compares the outputs of the weld analytical model and process response modules and has a large number of logic statements that have to be met in order to have a good weld. The analytical model is the reference; it tells what the different responses should be to have a quality weld. For instance, one statement is that the total heat input exceeds a certain amount to produce the weld nugget volume. Another criteria is that the measured nugget displacement is compared to the target displacement computed by the model; if it is too low the weld is rejected. The dynamic resistance should be between maximum and minimum limits. A high resistance can mean that there is excessive surface contamination which increases the surface resistance at all interfaces. A low workpiece temperature is one of several things that point toward an undersized nugget and a poor weld. High temperatures along the electrode axis mean that the water cooling system has failed or it is malfunctioning. The weld nugget size must exceed a certain size for the sheet metal thickness. The measured penetration is compared to the predicted penetration; low penetration, say below 50%, as measured by the ultrasonic technique is another indication of an unacceptable weld. Sudden velocity changes near the end of the weld show onset of expulsion. All of these statements have to be met to have an acceptable weld.

Stuck welds are, of course, to be avoided and there are many criteria, checking one another, that identify this undesirable condition. The Joule heat rate and total heat are low; not enough energy has been expended in the workpiece and not at the proper rate. There is lack of weld nugget penetration and nugget expansion is too far below the target. The measured workpiece surface temperature is low. Expulsion and onset of expulsion are to be avoided in precision spot welding. This condition is identified by the acceleration data, but the onset to expulsion is also predicted by the model. The contact areas and pressure distribution are computed, and the nugget diameter growth. When this nugget diameter is not contained by the set load and contact area, then there is onset to expulsion.

If the weld is rejected, the diagnostic criteria module 47 alerts production, for example by an audible alarm, and displays the reason for the faulty weld. The diagnostic criteria, beside a stuck weld and expulsion, may include: a coolant malfunction indicated by the temperature distribution along the electrode axis, a low primary circuit voltage meaning that it is impossible to make good welds until this is corrected, and an initial workpiece surface condition such as surface oxides or other contamination that prevent making a good weld. The diagnosis may identify an undersize nugget and an undersize diameter. This information is presented to the operator on the graphic display 43 who takes corrective action.

One set of resistance spot welding criteria and some of the diagnostic messages that are generated is as follows. The weld criteria selected depends on the application, being more stringent for aircraft than consumer major appliances, and the specifications chosen in the industry. Criteria 1 and 2 are prior to welding and 3–8 are based on computed model predictions and are not just empirical data as in the past.

1. Thickness Check $$R_1 < HM/H < R_2 \tag{1}$$

The ratio of the measured thickness, HM, to nominal thickness, H, is between ranges $R_1$ and $R_2$. If the thickness tolerance is 5%, the ratio is between 0.95 and 1.05.

2. Minimum Nugget Diameter $$D_{min} = .8\sqrt{H} \tag{2}$$

This equation relates the minimum weld nugget diameter to the total workpiece thickness.

3. Workpiece Interface Temperature $$T/T_{melt} - 1 < 0 \tag{3}$$

The temperature, T, at the interface between workpieces is less than the melting temperature. The diagnosis is that melting has not occurred at the faying surface.

4. Penetration $$PN = X_{melt}/H \qquad (4)$$

The weld nugget penetration, PN, is given by the ratio of the location of the melt interface, $X_{melt}$, to total workpiece thickness.

5. Penetration Check for Extremes $$0.01 < PN < 0.05 \qquad (5)$$

If nugget penetration is between 1% and 5%, the diagnosis is a stuck weld - change welding parameters.

$$PN > 0.8 \qquad (6)$$

If penetration is greater than 80%, the diagnosis is excessive penetration - check welding parameters.

6. Nugget Diameter Check $$DN > DE \qquad (7)$$

The weld nugget diameter, DN, is greater than a precalculated expulsion diameter, DE, at the workpiece interface. The diagnosis is expulsion threshold - change welding parameters.

7. Specification Check $$0.2 < PN < 0.8 \text{ and } DN > D_{min} \qquad (8)$$

When penetration is between 20% and 80% and nugget diameter exceeds the minimum diameter, the diagnosis is that the weld meets the specifications.

$$0.05 < PN < 0.2 \text{ or } DN < D_{min} \qquad (9)$$

If penetration is between 5% and 20% or nugget diameter is less than the minimum diameter, the weld does not meet the specifications on penetration and diameter.

8. Weld Nugget Thermal Expansion $$\delta_M = \delta_{computed} \qquad (10)$$

The measured expansion, $\delta_M$, is at least equal to the computed expansion to have a good quality weld.

If the weld is accepted, the weld characteristics (load, voltage, current, cycles) are stored in a long term record keeping file 48. The process monitor is used not only to display faulty welds, but also to print out or store in memory the predicted quality and geometry of the weld nugget. The monitor may be used as a recording device for all welds, and at a later time questionable welds are inspected by nondestructive evaluation methods (ultrasound, x-ray, etc.). This is for precision welding on spot welders, where no stuck welds are permissible, such as in the manufacture of high precision components for aerospace application.

Given the information herein, the computer programmer working with a welding engineer who has ordinary skill in the art will understand how to develop a microcomputer program.

In conclusion, the method of monitoring the resistance spot welding process is reviewed. The key to the invention is the incorporation of a simplified analytical model of the spot welding process in the microcomputer which serves as the reference for the multivariable sensing and decision logic system. Several welding input and welding response variables are measured. Computed response functions are derived during the welding operation from this analytical model which simulates the welding process and predicts the formation and growth of a weld nugget. Inputs to the model are the welding time, measured input variables, and known machine and workpiece parameters and material properties. Process response functions and rates are produced by presenting the measured response variables to a microprocessor. These process response functions and the computed response functions are compared and evaluated using the computed model as a reference, and the weld is accepted or rejected. A faulty weld is diagnosed and the reason for the poor weld is displayed.

APPENDIX

Resistance Spot Welding Analytical Model

Simplified closed-form solutions to the heat conduction and mechanical deformation differential equations were obtained to provide temperature distributions and thermal expansion for a computer model to simulate the resistance spot welding process. Material properties, power input, electrode and workpiece geometries, and applied electrode load are inputs to the model. The functional form of the solutions are cited together with the model flow chart, FIG. 9, which is considered to be self-explanatory (input data is at the side of the box).

(1) Temperature distribution (T) through the thickness:

$$T(x,t) = f_1[K, \rho, C, W, t, h, d]$$

(2) Workpiece thermal expansion ($\delta$) including contribution from electrodes:

$$\delta(t) = f_2[\alpha_{cu}, \alpha, h, H, W, d, K, \rho, C, t]$$

(3) Electrode contact diameter (d)

$$d = f_3[h, E, P]$$

(4) Weld nugget diameter (D):

$$D = f_4[H_N]$$

The solutions (1) through (4) were obtained from a mathematical model. Another approach can be based on an emphirical model having the same functional form with unknown coefficients which can be determined from expermental data. Either model would then serve as a reference for monitoring the process.

Nomenclature

K = workpiece thermal conductivity
$\rho$ = workpiece density
C = workpiece specific heat
h = workpiece thickness
$\alpha$ = workpiece thermal expansion coefficient
E = workpiece modulus of elasticity
$T_M$ = workpiece melting temperature
d = electrode contact diameter
$\alpha_{cu}$ = electrode thermal expansion coefficient
H = electrode length
P = electrode axial load
$H_N$ = weld nugget height
W = welding power
t = welding time (cycles)

The following summary of solutions are for 18-8 stainless steel:

(1) Temperature Distribution Through Thickness $T(x,t) =$ $$T_E - \frac{4}{\pi}(T_E - T_o) \sum_{n=1,3,5}^{\infty} \frac{1}{n} e^{-\frac{(n\pi)^2}{240}\frac{\kappa t}{h}} \sin\left(\frac{n\pi x}{2h}\right) +$$

$$13.462 \left(\frac{Wh}{d^2 K}\right) \sum_{n=1,3,5}^{\infty} \frac{1}{n^3}\left(1 - e^{-\frac{(n\pi)^2}{240}\frac{\kappa t}{h^2}}\right) \sin\left(\frac{n\pi x}{2h}\right)$$

| | | |
|---|---|---|
| $T_E$ = | measured electrode temperature | (°F.) |
| $T_o$ = | reference temperature | (°F.) |
| $\kappa$ = | thermal diffusivity | (in²sec) |
| $t$ = | welding time | (cycles) |
| $h$ = | workpiece thickness | (inch) |
| $W$ = | welding electrical power | (watts) |
| $\rho$ = | density | (lbs/in³) |
| $C_v$ = | specific heat | (btu/lb-°F.) |
| $K$ = | thermal conductivity | (btu/hr-ft-°F.) |
| $d$ = | electrode contact diameter | (inch) |

$\kappa$ computed from $$\kappa = \frac{23.148 \times 10^{-6}(K)}{\rho C_v}$$

(2) Weld Nugget Expansion δ(t) Including Electrodes $$\delta(t) = \alpha_{cu}H(T_E + T_W - 2T_o) + 2\alpha h(T_E - T_o) -$$

$$1.621\, h\alpha(T_E - T_o)e^{-\frac{\pi^2}{240}\frac{\kappa t}{h^2}} +$$

$$17.141 \frac{Wh^2\alpha}{d^2K}\left[\frac{\pi^4}{96} - e^{-\frac{\pi^2}{240}\frac{\kappa t}{h^2}}\right]$$

| | | |
|---|---|---|
| $\alpha_{cu}$ = | coefficient of expansion of electrode | (in/in/°F.) |
| $\alpha$ = | coefficient of expansion of workpiece | (in/in/°F.) |
| $d$ = | electrode contact diameter | (inch) |
| $h$ = | workpiece thickness | (inch) |
| $T_E$ = | electrode temperature | (°F.) |
| $T_o$ = | reference temperature | (°F.) |
| $T_W$ = | water temperature | (°F.) |
| $\kappa$ = | thermal diffusivity | (in²/sec) |
| $t$ = | welding time | (cycles) |
| $K$ = | thermal conductivity | (btu/hr-ft-°F.) |
| $H$ = | distance from electrode tip to water channel | (inch) |
| $W$ = | welding electrical power | (watts) |

(3) Spherical Tip Electrode Contact Radius (3″ tip radius)

$r = 7.3280075 \times 10^{-10} + 1.4383333 \times 10^{-4} P -$
$1.3716665 \times 10^{-7} P^2 + 6.4666654 \times 10^{-11} P^3 -$
$1.133333 \times 10^{-14} P^4$ $0 \leq P \leq 2000$ lbs.
$P$ = spherical tip electrode load (lbs)
$r$ = electrode contact radius (inch)

(4) Weld Nugget Diameter $D = .1 + 3.8445601 H_N - 4.3191233 \times 10^2 H_N^2 +$
$1.7771073 \times 10^4 H_N^3 - 2.8523129 \times 10^5 H_N^4 +$
$1.6694204 \times 10^6 H_N^5$ $H_N$ = weld nugget thickness (inch)
$D$ = weld nugget diameter (inch)

While the invention has been particularly shown and described with reference to preferred embodiments thereof, it will be understood by those skilled in the art that various changes in form and details may be made therein without departing from the spirit and scope of the invention.

The invention claimed is:

1. A method of monitoring a resistance spot welding process to provide information on weld quality during the weld cycle of a welding machine which applies an electrode mechanical load and has a secondary circuit that supplies power for a known welding time to the electrodes comprising:

measuring a plurality of welding input variables such as electrode load and tip voltage, and secondary circuit current;

during the weld measuring a plurality of welding response variables such as electrode displacement due to workpiece thermal expansion and electrode temperatures;

providing said measured input variables, welding time, and known machine and workpiece parameters and material properties to a simplified analytical model comprising mathematical equations which simulates the spot welding process and predicts the formation and growth of a weld nugget and computes response functions of acceptable welds;

deriving process response functions and rates per welding cycle from said measured response variables; and comparing and evaluating said process response functions and computed response functions using the latter as a reference and relative to criteria for good quality welds, and accepting or rejecting the weld.

2. The method of claim 1 wherein said computed response functions include at least several of the following: contact area between electrode and workpiece and between workpieces, workpiece dynamic resistance, Joule heating rate, total heat, workpiece thermal expansion, weld nugget geometry, and temperature distribution in the workpiece.

3. The method claim 2 wherein said machine and workpiece parameters and material properties include the workpiece material and thickness and electrode type which are input from an operator terminal, and known workpiece and electrode properties which are input from material and electrode files.

4. The method claim 2 wherein another measured welding response variable is weld nugget penetration.

5. The method of claim 2 and diagnosing faulty welds including stuck welds and expulsion and alerting the operator to the reason for the unacceptable weld.

6. A multivariable process monitor used with a resistance spot welding machine having electrodes between which a workpiece is held and welded by passage of current for a given time, comprising:

first sensors to measure welding input variables and second sensors to measure welding response variables;

means for inputting and storing known machine and workpiece parameters and material properties;

means, to which signals from said first sensors, welding time, and parameters and properties are presented, for analytically modeling and simulating the spot welding process by a number of mathematical equations and producing computed response functions, welding cycle by welding cycle, under the actual welding conditions;

means to which signals from said second sensors are presented for computing process response functions and rates, cycle by cycle; and means for comparing and evaluating said process response and computed response functions with reference to the latter and criteria in the form of logic statements to be met for good quality welds, and accepting or rejecting the weld.

7. The process monitor of claim 6 and means for diagnosing and displaying to an operator the reason for a rejected weld.

8. The process monitor of claim 6 wherein said first sensors include means to measure electrode load, tip voltage, and current and said second sensors include means to measure electrode displacement and temperatures at the workpiece surface and along the electrode axis.

9. The process monitor of claim 8 wherein said second sensors further include means to measure one or both of weld nugget penetration and electrode acceleration.

10. A method of monitoring a resistance spot welding process performed on a welding machine which applies an electrode mechanical load to the workpiece and has an electrical energizing circuit that supplies power for a known welding time to the electrodes, comprising:

measuring a plurality of welding input variables and workpiece response variables;

deriving computed response functions during the welding operation from a simplified analytical model comprising a number of mathematical equations that simulates the spot welding process and predicts the formation and growth of a weld nugget, inputs to said model being the measured input variables and welding time, and known machine and workpiece parameters and material parameters;

processing said measured response variables to produce process response functions and rates, comparing and evaluating said process response functions and computed response functions using said analytical model as a reference and weld criteria that are met in order to have a quality weld, and accepting or rejecting the weld;

and diagnosing a faulty weld and displaying the reason for the unacceptable weld.

11. The method of claim 10 wherein said welding input variables include electrode load and tip voltage, secondary circuit current, and primary circuit voltage, and wherein said welding response variables include electrode displacement due to thermal expansion and workpiece surface and electrode temperatures.

12. The method of claim 10 further including storing the characteristics of acceptable welds in a record file.

* * * * *